UNITED STATES PATENT OFFICE.

LEO ROON, OF ELMHURST, NEW YORK, ASSIGNOR TO THE EQUITABLE TRUST COMPANY, OF NEW YORK, N. Y., A CORPORATION OF NEW YORK, AS ADMINISTRATOR OF THE LOWELL M. PALMER ESTATE.

MANUFACTURE OF CALCIUM CARBONATE.

1,372,193. Specification of Letters Patent. Patented Mar. 22, 1921.

No Drawing. Application filed April 26, 1919. Serial No. 293,038.

*To all whom it may concern:*

Be it known that I, LEO ROON, a citizen of the United States, residing at Elmhurst, Long Island, in the county of Queens, State of New York, have invented certain new and useful Improvements in the Manufacture of Calcium Carbonate; and I do hereby declare the following to be a full, clear, and exact description of the invention, such as will enable others skilled in the art to which it appertains to make and use the same.

This invention relates to the production of calcium carbonate by the action of carbon dioxid upon milk of lime, and more particularly to the production of dry pulverulent calcium carbonate from milk of lime by a combined carbonating and drying operation.

According to the present invention milk of lime is supplied to an atomizing nozzle and is atomized by a blast of compressed gas, and the resulting mist is caused to react with carbon dioxid to form the calcium carbonate. This atomizing of the milk of lime and the bringing about of the reaction of the atomized product with the carbon dioxid can be effected in various ways, as will be evident from the following more detailed description of certain embodiments of the invention.

According to one embodiment of the invention, the milk of lime is atomized by means of compressed carbon dioxid gas or gaseous mixtures containing carbon dioxid. While the milk of lime is in the atomized condition, the particles absorb the carbon dioxid supplied by the atomizing blast, and convert the mist of milk of lime into a mist of aqueous calcium carbonate. The atmosphere into which the mist is discharged may itself contain further amounts of carbon dioxid to assist in the desired carbonation.

The fine mist of aqueous calcium carbonate thus produced can be converted into a dry powder by bringing it into a hot atmosphere adapted to remove the water therefrom. The fine mist of aqueous calcium carbonate may thus be brought into contact with a stream of hot, clean furnace or kiln gas, containing carbon dioxid, or ordinary pre-heated air, for example, by discharging a blast of the hot gas or air against or into the calcium carbonate mist. The water contained in the finely subdivided mist of calcium carbonate may be thereby rapidly evaporated and the product dried. The finely divided and dry calcium carbonate thus produced is floated off to a cool zone, *e. g.,* to the bottom of the spraying chamber, and collected.

According to another embodiment of the invention, the milk of lime is atomized by means of a blast of compressed air into an atmosphere of carbon dioxid or of flue or kiln gases containing relatively high quantities of carbon dioxid in such a way that there is sufficient carbon dioxid present to convert all of the carbon dioxid in the atomized milk of lime into calcium carbonate. If the milk of lime is atomized into an atmosphere containing carbon dioxid at ordinary temperature a wet calcium carbonate is produced and may be collected in a wet state and subsequently dried. However, by atomizing the milk of lime into a heated atmosphere containing carbon dioxid and particularly if the milk of lime is atomized into a current of gases containing carbon dioxid, heated to the proper temperature, evaporation of the water in the atomized product is effected and carried off as a part of the same operation by which the carbonation is effected.

It will be evident that different gases can be employed for the atomizing of the milk of lime, including compressed air, as well as compressed gases containing carbon dioxid, such as furnace or kiln gases, or compressed carbon dioxid itself. If the process is carried out at the same plant at which the limestone is burned, the kiln gases may be employed, if sufficiently rich in carbon dioxid, and these gases can, of course, be preliminarily purified, if necessary. The carbon dioxid can also be obtained in a concentrated state, or in a state of purity, in any suitable manner, as will be readily understood. It may thus be supplied in the usual cylinders and made use of either for atomizing of the milk of lime, or for supplying a carbon dioxid atmosphere, or both, for the atomizing and for the atmosphere into which the mist is discharged. Where pure carbon dioxid is thus employed, the excess gas can be circulated from the spraying chamber through a dehydrator and heater and returned as a heated gas for further use in the carbonating and drying operation, Superheated steam may also be employed for atomizing the milk of lime, or even saturated steam under suitable pressure, in which case no mechanical compressor for compressing the atomizing blast will be required.

The atmosphere into which the milk of lime is atomized can also be varied to give any desired content of carbon dioxid therein, and any desired rate of supply of heated gas thereto for the drying operation. The hot furnace or kiln gases can thus be supplied directly for promoting the carbonating and drying operation, particularly where these gases are of sufficient purity, or where a calcium carbonate of the highest purity is not required.

The milk of lime employed in the process of the present invention can be produced in any suitable manner. Ordinary burned lime may be slaked and the slaked lime subjected to classification to separate the coarser particles. For fine calcium carbonate the milk of lime may thus be passed through a suitable screen, for example, of 100 or 125 mesh, and the fine milk of lime then employed in the manufacture of the calcium carbonate. If the calcium carbonate is to be used for purposes where a product of high purity is required, the milk of lime itself should be of corresponding purity. The milk of lime may contain varying amounts of water, but, for maximum yields, a minimum amount of water should be used, so that there will be less water to be subsequently removed. In the production of a finer product, however, it may be desirable to use a more dilute milk of lime, as well as to regulate the temperature of the carbon dioxid atmosphere into which it is atomized, and the time and temperature of reaction and drying.

It will be evident that various forms of apparatus are available for carrying out the process of the present invention. The milk of lime may thus be supplied to the atomizing nozzle by means of the suction induced by the atomizing blast, which blast may surround the supply nozzle for the milk of lime, or may be otherwise suitably arranged to give the desired atomizing effect and the production of a mist of suitable fineness. Various types of atomizing nozzles can be employed, provided they atomize the milk of lime to the required degree and produce a mist of suitable fineness. The steam or compressed air or compressed carbon dioxid, etc., may be supplied under a suitable pressure, which may vary with the particular type of atomizing nozzle employed. In general, a pressure of about from 10 to 50 pounds can be used, or a medium of about 30 to 35 pounds per square inch. The blast of compressed air or of other atomizing gas or gaseous mixture may be obtained in any suitable way. Air may thus be compressed and supplied directly to the atomizing nozzle under the proper pressure. Flue or kiln gases containing carbon dioxid may be similarly compressed and supplied to the atomizing blast, and these gases may be subjected to preliminary purification to remove objectionable constituents therefrom.

For the purpose of supplying a current of hot air or a current of heated gases containing carbon dioxid for the drying of the mist of calcium carbonate, various arrangements of apparatus and of supply pipes for the hot gases can be used. The milk of lime may thus be atomized horizontally into a large chamber containing an atmosphere of carbon dioxid or of gases containing carbon dioxid, and a blast of hot air may be introduced at a lower level and caused to pass upwardly so that it will come in contact with the mist and remove the water therefrom. The dried mist may be collected at the bottom of the atomizing chamber, or it may be carried over into a separate chamber and there collected. The last portions of the finely divided calcium carbonate which may be carried over with the outgoing current of air or gas, may be separated, for example, in a centrifugal fan separator. In general, similar arrangements of apparatus for atomizing and drying the calcium carbonate produced can be employed as are employed in the atomizing and drying of inert substances which undergo no chemical change during the drying operation. The process of the present invention is distinguished from such drying operations by the two-fold character of the operation, which involves the reaction of the milk of lime with the carbon dioxid to form calcium carbonate in the form of a mist, and the dehydration of this mist to give the dry calcium carbonate.

When the atomizing of the milk of lime is effected by steam under suitable pressure, the milk of lime will be thereby pre-heated so that the reaction with the carbon dioxid will be thereby facilitated. Steam may also be present in the atmosphere into which the milk of lime is atomized. When the milk of lime is atomized with steam into an atmosphere of hot flue gas or of hot furnace gas containing carbon dioxid, the hot gaseous atmosphere together with the heat supplied by the steam will coöperate in bringing about the carbonating of the milk of lime and the dehydration thereof to form the dry calcium carbonate. If the hot flue or furnace gas is supplied directly from the furnace or kiln in a heated state, no added power will ordinarily be required, inasmuch as the high pressure steam will avoid the necessity for separately compressing air or other gas for the atomizing operation.

If the drying of the mist of calcium carbonate formed is not completed, for example, if the calcium carbonate obtained is still moist and contains, for example, about 10 to 20% of water, this calcium carbonate will more readily separate out, and it can then be subjected to a further drying operation, as by passing it through a drying tunnel for the final drying thereof.

If the carbonating of the milk of lime mist is not completed by a single atomizing thereof into the carbonating atmosphere, as where the atmosphere is deficient in carbon dioxid, the resulting partially carbonated milk of lime may be collected without drying, or with partial or complete drying, and again subjected to the atomizing and carbonating process, with the addition of further amounts of water, if necessary, so that it can be handled in the form of an equeous suspension, and again atomized by the blast or compressed gas into the carbonating atmosphere. That is, the same milk of lime can be progressively carbonated by a repeated atomizing operation until the carbonating is entirely complete. This recirculation of the milk of lime and progressive formation of the calcium carbonate, as where the atmosphere is deficient in carbon dioxid, may be effected without simultaneous drying of the most, and there may thus be obtained a suspension or milk of the partially carbonated product, and finally of the completely carbonated product. Where the calcium carbonate is thus produced without dehydration, it may then be subjected to a separate atomizing operation for the purpose of dehydration. It may thus be atomized with a blast of compressed air and the resulting mist brought into contact with a blast of hot drying gas, which will effect the removal of the water and the production of a dry pulverulent calcium carbonate product. In this case, separate atomizing nozzles and separate chambers can be used for the atomizing and carbonating reaction, and for the subsequent atomizing and drying operation.

The calcium carbonate produced according to the process of the present invention can be used as chalk or as whiting or for other purposes for which it may be adapted.

Instead of producing calcium carbonate from milk of lime, other alkali earth metal carbonates can be similarly produced from other alkali earth metal hydroxids, for example, magnesium carbonate or barium carbonate can be similarly produced from suspensions of magnesium hydrate and barium hydrate respectively.

I claim:

1. The method of producing calcium carbonate which comprises atomizing milk of lime with an atomizing gas and causing the resulting mist to react with carbon dioxid to form a mist of aqueous calcium carbonate.

2. The method of producing calcium carbonate, which comprises atomizing milk of lime into an atmosphere containing carbon dioxid, the atomizing being effected with an atomizing gas containing carbon dioxid, and thereby causing the resulting mist to react with the carbon dioxid to form a mist of aqueous calcium carbonate.

3. The method of producing dry pulverulent calcium carbonate which comprises atomizing milk of lime, causing the resulting mist to react with carbon dioxid to form a mist of aqueous calcium carbonate, removing the water from such mist, and collecting the dried product.

4. The method of producing dry pulverulent calcium carbonate which comprises atomizing milk of lime by means of compressed carbon dioxid or gases containing carbon dioxid, causing the resulting mist to react with the carbon dioxid to form a mist of aqeuous calcium carbonate, removing the water from such mist, and collecting the dried product.

5. The method of producing dry pulverulent calcium carbonate which comprises atomizing milk of lime into an atmosphere of carbon dioxid or rich in carbon dioxid, whereby the resulting mist is caused to react with the carbon dioxid to form a mist of calcium carbonate, removing the water from such mist, and collecting the dried product.

6. The method of producing dry pulverulent calcium carbonate which comprises atomizing milk of lime, causing the resulting mist to react with carbon dioxid to form a mist of aqueous calcium carbonate, removing the water from such mist by subjecting it to the action of a hot gaseous current or blast, and collecting the dried product.

7. The method of producing dry pulverulent calcium carbonate, which comprises atomizing milk of lime by means of compressed carbon dioxid or gases containing carbon dioxid, causing the resulting mist to pass through heated gases containing carbon dioxid and thereby removing the water from the mist, and collecting the dried calcium carbonate.

8. The method of producing alkaline earth metal carbonate which comprises atomizing a liquid containing an alkaline earth metal hydroxid with an atomizing gas and causing the resulting mist to react with carbon dioxid to form a mist of aqueous alkaline earth metal carbonate.

9. The method of producing alkaline earth metal carbonate, which comprises atomizing a liquid containing an alkaline earth metal hydroxid into an atmosphere containing carbon dioxid, the atomizing being effected with an atomizing gas containing carbon dioxid, and thereby causing the resulting mist to react with the carbon dioxid to form a mist of aqueous alkaline earth metal carbonate.

10. The method of producing dry pulverulent alkaline earth metal carbonate which comprises atomizing a liquid containing an alkaline earth metal hydroxid, causing the resulting mist to react with carbon dioxid to form a mist of aqueous alkaline earth metal carbonate, removing the water from such mist, and collecting the dried product.

11. The method of producing dry pulverulent alkaline earth metal carbonate which comprises atomizing a liquid containing an alkaline earth metal hydroxid by means of compressed carbon dioxid or gases containing carbon dioxid, causing the resulting mist to react with the carbon dioxid to form a mist of aqueous alkaline earth metal carbonate, removing the water from such mist, and collecting the dried product.

12. The method of producing dry pulverulent alkaline earth metal carbonate which comprises atomizing a liquid containing an alkaline earth metal hydroxid into an atmosphere of carbon dioxid or rich in carbon dioxid, whereby the resulting mist is caused to react with the carbon dioxid to form a mist of carbonate, removing the water from such mist, and collecting the dried product.

13. The method of producing dry pulverulent alkaline earth metal carbonate which comprises atomizing a liquid containing an alkaline earth metal hydroxid, causing the resulting mist to react with carbon dioxid to form a mist of aqueous alkaline earth metal carbonate, removing the water from such mist by subjecting it to the action of a hot gaseous current or blast, and collecting the dried product.

14. The method of producing dry pulverulent alkaline earth metal carbonate, which comprises atomizing a liquid containing an alkaline earth metal hydroxid, by means of compressed carbon dioxid or gases containing carbon dioxid, causing the resulting mist to pass through heated gases containing carbon dioxid and thereby removing the water from the mist, and collecting the dried alkaline earth metal carbonate.

In testimony whereof I affix my signature.

LEO ROON.